United States Patent [19]
Marshall

[11] Patent Number: 5,815,220
[45] Date of Patent: Sep. 29, 1998

[54] COLOR DEMODULATION FOR DIGITAL TELEVISION

[75] Inventor: Stephen W. Marshall, Richardson, Tex.

[73] Assignee: Texas Instruments Incorporated, Dallas, Tex.

[21] Appl. No.: 706,102

[22] Filed: Aug. 30, 1996

[51] Int. Cl.[6] .................................................. H04N 5/213
[52] U.S. Cl. .......................... 348/727; 348/663; 348/726; 375/321
[58] Field of Search ..................... 348/727, 725, 348/728, 726, 663, 639, 638; H04N 5/213

[56] References Cited

U.S. PATENT DOCUMENTS

| | | | |
|---|---|---|---|
| 5,347,321 | 9/1994 | Gove | 348/663 |
| 5,457,500 | 10/1995 | Harford | 348/624 |
| 5,473,388 | 12/1995 | Takak et al. | 348/640 |
| 5,477,199 | 12/1995 | KMontreuil | 332/103 |
| 5,495,203 | 2/1996 | Harp et al. | 329/306 |
| 5,502,509 | 3/1996 | Kurashita et al. | 348/669 |
| 5,517,255 | 5/1996 | Gia et al. | 348/666 |
| 5,526,060 | 6/1996 | Raby | 348/663 |
| 5,526,062 | 6/1996 | Harford | 348/727 |
| 5,541,672 | 7/1996 | Goeckler | 348/726 |
| 5,572,264 | 11/1996 | Mikukami et al. | 348/735 |
| 5,654,767 | 8/1997 | Ikeda et al. | 348/638 |
| 5,673,299 | 9/1997 | Scarpa et al. | 375/321 |

*Primary Examiner*—John K. Peng
*Assistant Examiner*—James Reed, Jr.
*Attorney, Agent, or Firm*—Julie L. Reed; James C. Kesterson; Richard L. Donaldson

[57] ABSTRACT

A digital sampling and separation unit (12) for a television receiver (10) of a composite video signal, such as an NTSC signal, which has a color subcarrier. The video signal is sampled at a frequency selected in accordance with the invention. This frequency provides samples having a definite and repeating phase relationship with the subcarrier signal. (FIG. 4). As a result, phase reference values can be used to convert the samples into correct color difference values.

20 Claims, 3 Drawing Sheets m +/- .25

|   | 4.75 | 5.25 | 5.75 |
|---|------|------|------|
| 17 | 12.78 | 11.56 | 10.56 |
| 18 | 13.53 | 12.27 | 11.18 |
| 19 | 14.29 | 12.93 | 11.80 | n $\frac{1}{T_{pc}} = f\ pc\ (MHz)$

COLOR DEMODULATION FOR DIGITAL TELEVISION

TECHNICAL FIELD OF THE INVENTION

This invention relates to digital television receivers that receive composite television signals, and more particularly to providing color-separated pixel data from the television signal.

BACKGROUND OF THE INVENTION

In many television broadcast signals, notably those adhering to the NTSC and PAL standards, there is a defined relationship between the horizontal line frequency (Fh) and the color subcarrier frequency (Fsc). For example, in NTSC signals, luminance and chrominance are transmitted in a single channel by using a chrominance subcarrier at 3.58 MHz, which is equal to the line frequency, 15,734.26 Hz, times 455/2. At the television receiver, the chrominance subcarrier provides a reference signal for separating chrominance from luminance (color separation) and for separating the chrominance components (demodulation).

In digital television systems that follow NTSC standards, typical digital color separation algorithms call for a sampling rate that is some multiple of the 3.58 MHz subcarrier frequency. A commonly used sampling rate is approximately 14.318 MHz, referred to as the "4 fsc" rate. This sampling rate provides chrominance samples that are quadrature spaced. For demodulation, all that is left to do is to separate even and odd samples into two paths and low pass filter them. The even samples are pixel values for one color component and the odd samples are pixel values for the other.

A problem with the 4 fsc sampling rate is that it is not always consistent with the sampling rate required for a desired number of pixels per line (horizontal resolution). For example, for a 480 line display with a 4:3 aspect ratio, 640 pixels per line are required. Yet, a 4 fsc sample rate yields about 747 active samples per line. For a square pixel display with a one-to-one pixel to sample ratio, this is a distortion ratio of 16.7%.

Some existing systems provide the required number of samples per line by first sampling the incoming composite signal at 4 fsc and then scaling the samples to the desired number of samples per line. However, a problem with scaling is that visual artifacts are likely to occur. Also, the increased complexity of such systems makes them more costly.

U.S. Pat. No. 5,347,321, entitled "Color Separator for Digital Television System", assigned to Texas Instruments Incorporated, describes one solution to color separation and sampling. The luminance and chrominance signals are separated before sampling. The luminance signal is sampled at a rate appropriate for the desired horizontal resolution, thereby eliminating the need for scaling luminance data. The chrominance signal is sampled at 4 fsc so that the color components can be easily separated, and then the samples are scaled.

SUMMARY OF THE INVENTION

One aspect of the invention is a digital sampling and color separation unit for a receiver of an analog video signal having a quadrature-modulated color subcarrier signal. Well known examples of such signals are television signals adhering to the NTSC or PAL standards. An analog-to-digital converter samples the video signal at a sampling frequency. The sampling frequency is such that an integer number of samples are acquired in a time equal to an integer number, plus or minus 0.25, times the period of said subcarrier signal. The sampled video data is delivered to a luminance-chrominance separator, which separates the sampled video data into luminance data and chrominance data. During the sampling process, a digital oscillator operates at the sampling frequency to provide a phase reference value for each chrominance sample. The phase reference values each represent a phase relationship between a chrominance sample and the subcarrier signal. A memory, such as a look-up table addressed by the phase reference values, stores sin and cosine values and matches the phase reference values to the sin and cosine values. A digital demodulator receives the sin and cosine values and the chrominance samples and multiplies each chrominance sample by a sin or a cosine value, thereby providing color data. The resulting output of the sampling and color separation unit is pixel data in three channels, one for luminance data and two for color data.

An advantage of the invention is that it provides color-separated pixel data from a composite video signal in a simple and straightforward manner. At the same time, the sampling frequency can be varied to satisfy the horizontal resolution requirements for various display formats. Any sampling frequency that meets the above requirements is suitable. For a given horizontal resolution, the sampling frequency is selected by calculating the qualifying sampling frequency that is closest to a target frequency that will produce a desired number of samples per lines.

DETAILED DESCRIPTION OF THE INVENTION

Figure 1:
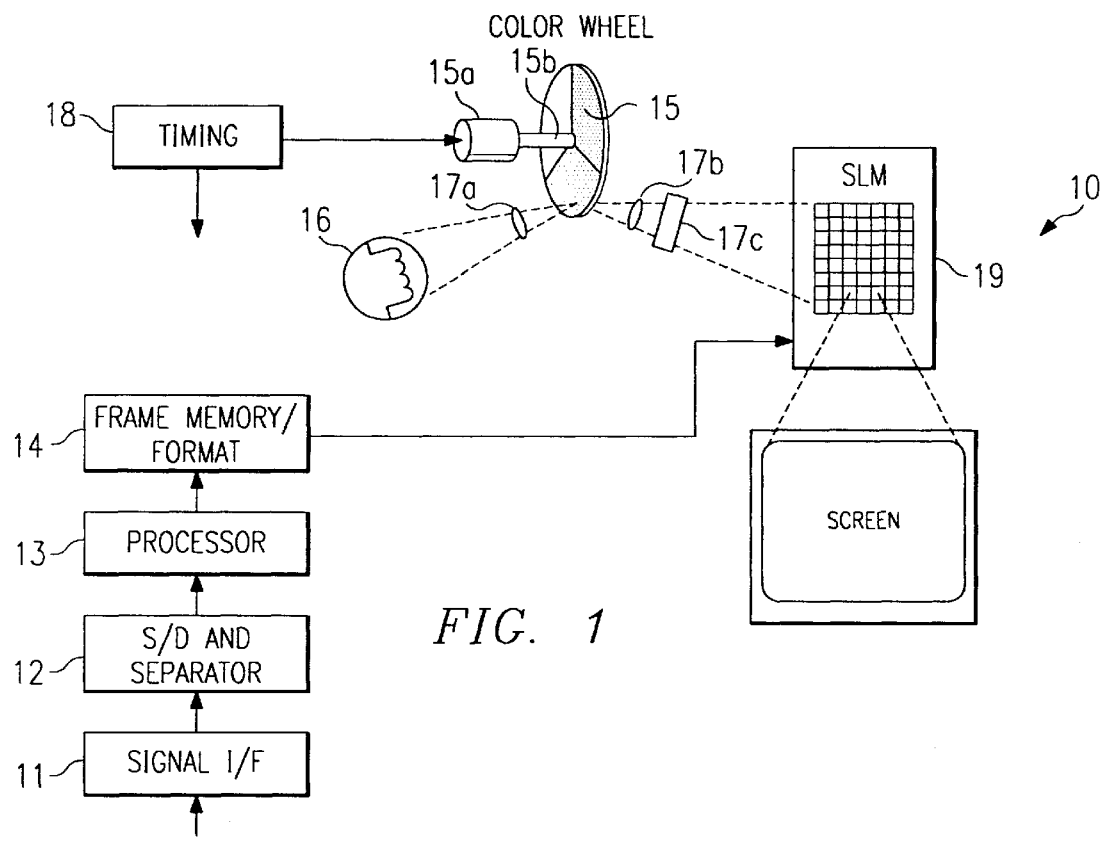
FIG. 1 is a block diagram of video-related components of a digital television receiver, having a sampling and separation unit in accordance with the invention.

FIG. 1 illustrates digital data path components of a digital display system 10. It should be understood that only components used for obtaining and displaying pixel data are shown; components used for tasks such as synchronization and audio signal processing are not shown. Finally, although the following description is in terms of a display system 10 for a broadcast television signal, it should be understood that display system 10 could be any type of equipment for receiving an analog composite video signal and displaying or storing images represented by the signal.

Display system 10 uses a spatial light modulator, in particular, a digital micro-mirror device 19, for generating displays. This device is explained in further detail below, but could be replaced by other pixel array devices. The invention is directed to a sampling and color separation unit 12, which samples a composite video signal in a manner that facilitates color separation, including demodulation of chrominance data into color difference data. Although not shown in FIG. 1, sampling and separation unit 12 could be used with a digital display system that has a cathode ray tube (CRT) display instead of SLM 19. For such systems, the data is converted back to analog form and scanned to the CRT instead of being delivered to SLM 19.

The following overview of the various components of display system 10 provides details helpful to understanding of the invention. Further details pertaining to a DMD-based image display system are set out in U.S. Pat. No. 5,079,544, entitled "Standard Independent Digitized Video System"; U.S. patent Ser. No. 08/147,249, entitled "Digital Television System"; and in U.S. patent Ser. No. 08/146,385, entitled "DMD Display System". Each of these patents and patent applications is assigned to Texas Instruments Incorporated, and each is incorporated herein by reference.

The video input may be any analog composite signal having chrominance and luminance components. The luminance component is referred to herein as the "Y" component, and the chrominance component as the "C" component. The C component is comprised of two color difference signals, for example, $C_R$ and $C_B$. The chrominance signal is amplitude and phase modulated on a color subcarrier, for example, the 3.58 MHz subcarrier used for NTSC signals.

For purposes of this description, it is assumed that the sampling frequency for conventional digital color separation is not necessarily the same as the sampling frequency that will provide the desired number of samples per line. For example, as discussed in the Background, in an NTSC system, a 4 fsc sampling frequency does not necessarily provide the desired number of samples per line for a 4:3 aspect ratio.

A signal interface 11 provides conventional signal interface functions, such as tuning, filtering, and synchronization signal removal. For purposes of the invention, the main function of interface 11 is to provide a composite Y/C signal to sampling and separation unit 12.

Sampling and separation unit 12 is discussed in detail in connection with FIGS. 2–5. As discussed below, it samples the analog signal at a sampling frequency determined in accordance with the invention. This sampling frequency has a specific relationship to the color subcarrier reference burst frequency, so that color difference values can be calculated. The samples provided by sampling and separation unit 12 are in three channels, a luminance data channel and two color difference data channels.

Pixel data processor 13 prepares the data for display, by performing various processing tasks. Processor 13 includes processing memory for storing pixel data during processing. The tasks performed by processor 13 may include linearization, color space conversion, and proscan. Linearization removes the effect of gamma correction, which is performed on broadcast signals to compensate for the non-linear operation of CRT displays. Color space conversion converts the data to RGB data. Proscan converts interlaced fields of data into frames by generating new data to fill in odd or even lines. The order in which these tasks are performed may vary.

Frame memory 14 receives processed pixel data from processor 13. Frame memory 14 formats the data, on input or on output, into "bit-plane" format and delivers the bit-planes to SLM 19. The bit-plane format provides one bit at a time for each pixel of SLM 19 and permits each pixel to be turned on or off in accordance with the weight of that bit.

For example, where each pixel is represented by n bits for each of three colors, there will be 3 n bit-planes per frame. Bit-planes containing less significant bits will result in shorter display times than the bit-planes containing more significant bits. A pixel value of 0 (black) results in the pixel being off for that color during the frame. For each color, each mirror element of the SLM 19 can be "on" for a duration of anywhere from 1 LSB (least significant bit) period to $2^n-1$ LSB periods. In other words, each color has $2^n-1$ time slices, during which any pixel can be on for any number of time slices between 0 and $2^n-1$.

In a typical display system 10, frame memory 14 is a double-buffer memory, which means that it has a capacity for at least two display frames. The buffer for one display frame can be read out to SLM 19 while the buffer for another display frame is being written. The two buffers are controlled in a "ping-pong" manner so that data is continuously available to SLM 19.

As stated above, this description is in terms of a display system whose SLM 19 is a digital micro-mirror device (DMD), characterized by individually addressable pixel elements, which are capable of being turned on or off simultaneously. Images are formed by addressing those pixels that are to be turned on during an image frame, and by controlling the length of time per frame that each pixel element is on. An example of an SLM is a digital mirror device (DMD), manufactured by Texas Instruments Incorporated. For purposes of this description, an SLM 19 with a vertical resolution of 480 lines is assumed. The mirror elements of the SLM 19 are square, such that for a given vertical resolution (VR) and a desired aspect ratio (AR), the horizontal resolution (HR) is determined by:

$$AR=HR/VR$$

For a 480 line display and an aspect ratio of 4:3, the number of pixels per line is:

$$4/3=HR/480$$

$$HR=640$$

Light incident on SLM 19 is provided by a light source 16 and is transmitted through a rotating color wheel 15. Lens 17a focusses the source illumination, in the form of a source beam, to a "spot size" at the plane of the color wheel 15. Lens 17b directs the light to SLM 19.

In the example of FIG. 1, color wheel 15 has three filter segments, each of a different primary color. For purposes of example herein, these colors are RGB colors: red, green, and blue. In alternative embodiments, other colors could be used and fewer or more than three colors could be used. Also, there could be more than one segment for each color. The segments need not be exactly the same size, depending on the desired color balance. The data for each color are sequenced and the display of the data is synchronized so that the portion of color wheel 15 through which light is being transmitted to SLM 19 corresponds to the data being displayed. In the example of this description, each pixel is represented by RGB data, which means that each pixel has a red value, a green value, and a blue value. As the values for each color of all pixels in a frame are being displayed, color wheel 15 rotates so that the light is transmitted through the corresponding red, blue or green filter. For each pixel, the combination of these three values is perceived as the desired color.

Color wheel 15 is attached to a shaft 15b, which is driven by motor 15a, causing color wheel 15 to rotate. A motor control unit 15c controls the speed and phase of color wheel 15. Where a frame of data is displayed for a frame period of T seconds, color wheel 15 has a period of revolution of T seconds. For example, the desired speed might be 60 revolutions per second to correspond to a 60 frame per second display rate.

Master timing unit 18 provides various system control functions. One timing signal provided by master timing unit 18 is a signal defining the display times for each bit weight of the pixel value. It may also provide the sample clock signal, at a frequency determined in accordance with the invention.

Although not illustrated in FIG. 1, system 10 also includes a projection lens and various other optical devices for collecting and projecting the image from SLM 19 to the image plane (screen).

Figure 2:
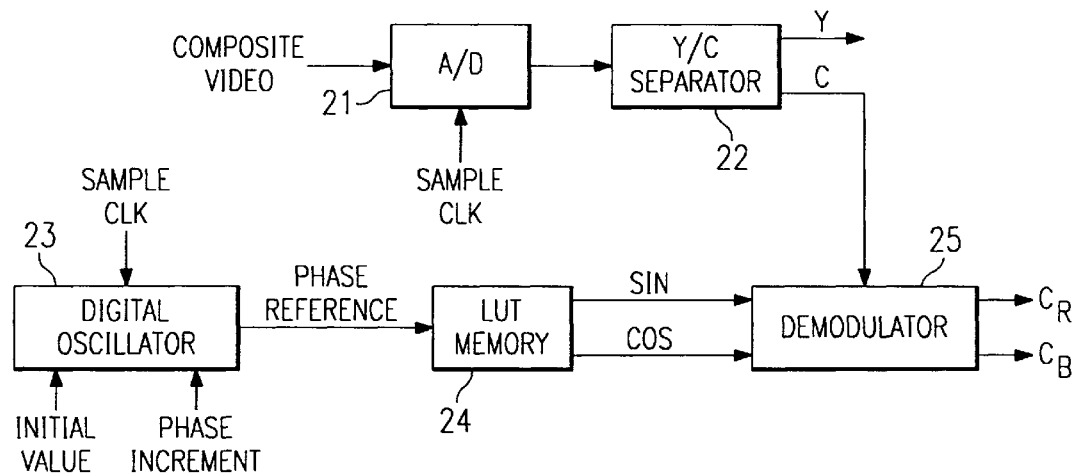
FIG. 2 is a block diagram of the sampling and separation unit of FIG. 1.
Figure 2A:
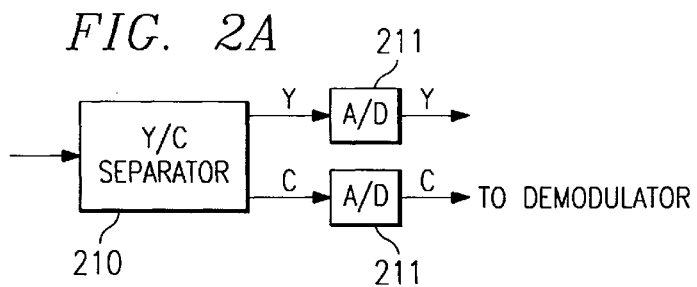
FIG. 2A is an alternative embodiment of the sampling and separation unit of FIG. 1.

FIG. 2 illustrates sampling and separation unit 12 in further detail. In the embodiment of FIG. 2, A/D converter 21 samples the data before digital Y/C separator 22 separates the Y (luminance) from the C (chrominance) data. However, as illustrated in the alternative embodiment of FIG. 2A, an analog Y/C separator 210 could be used instead of a digital Y/C separator 22, with two A/D converters 211 being used to sample the Y and C signals.

A/D converter 21 (FIG. 2) and A/D converters 211 (FIG. 2A) operate at a sampling rate in accordance with the invention. Referring to FIG. 2, A/D converter 21 receives the composite video signal. It samples this signal at a rate determined in accordance with the invention, such that an integer number, n, of samples at the sample clock frequency is equal in time to an integer number, m, plus or minus 0.25, cycles at fsc. Expressed mathematically:

$$nT_{pc} = (m \pm 0.25) T_{sc}$$

, where $T_{pc}$ is the period of the pixel (sample) clock and $T_{sc}$ is the period of the color subcarrier. For NTSC video, the subcarrier period, $T_{sc}$ is approximately 0.28 microseconds.

To select a sample rate, $T_{pc}$, a target sample rate is calculated and appropriate values of m and n are determined. In the example of this description, the target sample rate is 12.27 MHz, which is the sample rate that would provide 480 samples per line. The target sample rate is calculated according to the active line period and the number of pixels per line.

Figures 3, 5:
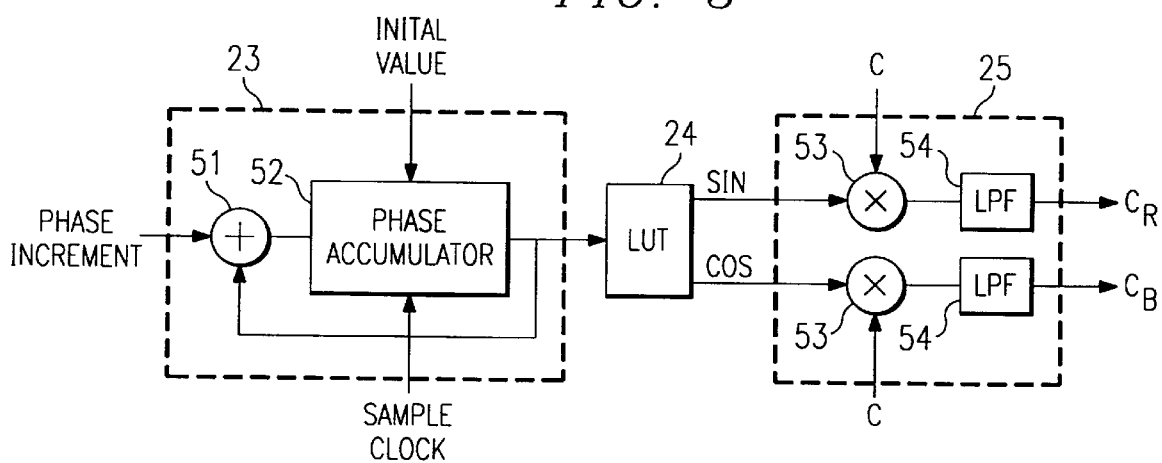
FIG. 3 illustrates how sampling frequencies are selected in accordance with the invention.
FIG. 5 illustrates the digital oscillator, look-up table, and demodulator of FIG. 2 in further detail.

FIG. 3 illustrates a matrix of n and m values substituted into the above equation, and the equation solved for various values of $1/T_{pc} = f_{pc}$. The calculated value of $f_{pc}$ closest to the target $f_{pc}$ is located. If the target $f_{pc}$ is 12.27 MHz, the closest sample rate is 12.27 MHz, which corresponds to m=5 and n=18. Thus, A/D converter 21 is operated at a sampling frequency of 12.27 MHz. Numbers have been rounded for convenience of description.

Referring again to FIG. 2, Y/C separator 22 receives the sampled data and separates Y (luminance) samples from C (chrominance) samples. Y/C separator 22 may be any digital means for separating the luminance data from chrominance data. Conventional digital color separation methods may be used, such as bandpass or comb filtering.

At this point, the Y data is ready for further processing, but the C data must first be demodulated into two channels of color difference samples. The sample rate of A/D converter 21 permits quadrature synchronous demodulation, with the use of digital oscillator 23, look-up table 24, and demodulator 25.

Figure 4:
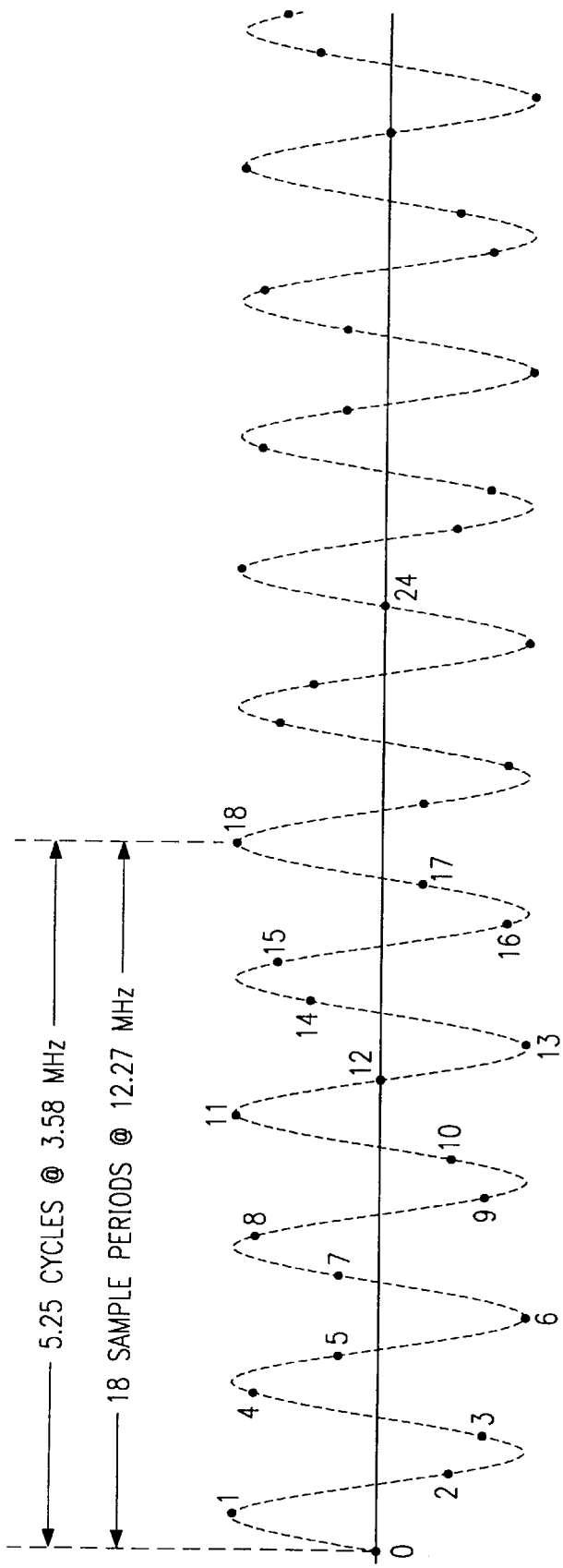
FIG. 4 illustrates samples acquired in accordance with the invention, and their phase relationship to the color subcarrier signal.

FIG. 4 illustrates the phase relationship between the chrominance samples provided by the 12.27 MHz sample rate and the subcarrier signal at 3.58 MHz. There are 18 samples per 5.25 cycles. These samples have a definite and repeating phase relationship with the sin and cosine values of the 3.58 MHz signal. As indicated, the phase relationship repeats every 24 sample periods.

Referring again to FIG. 2, digital oscillator 23 provides phase reference values to a memory 24, which then provides sin and cosine values to be multiplied times the sample values. In the example of this description, memory 24 is a look-up table (LUT) and is addressed by the phase reference values. Digital oscillator 23 accumulates phase increments each sample period, to accommodate the phase difference between the sample clock and $f_{sc}$. Each phase increment, pi, in degrees, is calculated as:

$$pi = \frac{360 * f_{sc}}{\text{sample frequency}}$$
$$= \frac{360(m + .25)}{n}$$

In the example of this description, each phase increment is:

$$pi = \frac{360(5.25)}{18}$$
$$= 105 \text{ degrees}$$

At every sample clock signal, this increment is added to the current phase, in 360 degree cycles. Oscillator 23 could be designed so that $2^k = 360$, where K is the number of bits and so that 111 . . . 1=360. An initial value is provided to establish the initial phase relationship between $f_{pc}$ and $f_{sc}$. This could be accomplished by comparing the offset at 0 points of the reference and sample signals. The phase increment could be modified slightly by the measured phase and magnitude of the color burst signal to phase lock oscillator 23 to the color burst.

Referring again to FIG. 2, the output of digital oscillator 23 drives a look-up table memory 24, which provides sin and cosine reference signals for the demodulation process. From memory 24, the sin and cosine values are delivered to a digital demodulator 25, which demodulates the chrominance data.

FIG. 5 is a block diagram of one embodiment of digital oscillator 23, LUT 24, and demodulator 25. Digital oscillator 23 is comprised of an adder 51 and an accumulator 52. Adder 51 adds the phase increment, as calculated above, to each current phase value, and the sum is accumulated by accumulator 52. The output of accumulator 52 drives LUT 24. The sin and cosine values from LUT 24 are multiplied, using multipliers 25, by the C data. Each sample of C data is multiplied by a cosine value and a sin value, to obtain a $C_B$ and a $C_R$ value.

As an example of the operation of demodulator 25, referring to FIG. 4, Sample 4 has a phase difference of 60 degrees (105 degrees*4 samples=420 degrees; 420 degrees− 360 degrees=60 degrees). If the value of Sample 4 is x, the color difference values for Sample 4 are x(cosine 60) and x(sin 60). These values are filtered with low pass filters 54 to provide the output chrominance data.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A digital sampling and color separation unit for a receiver of a composite video signal having a quadrature-modulated color subcarrier signal, comprising:

an analog-to-digital converter that samples said video signal at a sampling frequency such that an integer number of samples are acquired in a time equal to an integer number, plus or minus 0.25, times the period of said subcarrier signal, thereby providing sampled video data;

a digital luminance-chrominance separator that receives said sampled video data and separates said sampled video data into luminance data and chrominance data;

a digital oscillator for providing phase reference values at said sampling frequency, each phase reference value representing a phase relationship between a sample of said chrominance data and said subcarrier signal, such that each chrominance sample has an associated phase reference value;

a memory, driven by said digital oscillator, that stores sin and cosine values and that matches said phase reference values to said sin and cosine values; and a demodulator that receives said sin and cosine values and said chrominance data, multiplies each chrominance sample by a sin or a cosine value matched to the phase reference value associated with that sample, and low pass filters the product, thereby providing color difference data.

2. The sampling and color separation unit of claim 1, wherein said memory is a look-up table, addressed by said phase reference values.

3. The sampling and color separation unit of claim 1, wherein said digital oscillator comprises an adder and an accumulator.

4. The sampling and separation unit of claim 1, wherein said digital oscillator receives a phase increment value that it accumulates for each chrominance sample in 360 degree cycles.

5. The sampling and color separation unit of claim 1, wherein said demodulator comprises a multiplier and a low pass filter on a first data path that provide a first color difference signal, and a multiplier and a low pass filter on a second data path that provide a second color difference signal.

6. The sampling and color separation unit of claim 1, wherein said composite video signal is an NTSC signal, such that said period of said subcarrier signal is approximately 0.28 microseconds.

7. A chrominance sampling and demodulation unit for a receiver of a composite video signal having a quadrature-modulated color subcarrier signal, comprising:

an analog-to-digital converter that samples said subcarrier signal at a sampling frequency such that an integer number of samples are acquired in a time equal to an integer number, plus or minus 0.25, times the period of said subcarrier signal, thereby providing chrominance data;

a digital oscillator that provides phase reference values at said sampling frequency, said phase reference values each representing a phase relationship between a sample of said chrominance data and said subcarrier signal, such that each chrominance sample has an associated phase reference value;

a memory that stores sin and cosine values and matches said phase reference values to said sin and cosine values;

a demodulator that receives said sin and cosine values and said chrominance data, multiplies each chrominance sample by a sin or a cosine value matched to the phase reference value associated with that sample, and low pass filters the product, thereby providing said color difference data.

8. The sampling and color separation unit of claim 7, wherein said memory is a look-up table, addressed by said phase reference values.

9. The sampling and color separation unit of claim 7, wherein said digital oscillator comprises an adder and an accumulator.

10. The sampling and color separation unit of claim 7, wherein said digital oscillator receives a phase increment value which it accumulates for each chrominance sample in 360 degree cycles.

11. The sampling and color separation unit of claim 7, wherein said demodulator comprises a multiplier and a low pass filter on a first data path that provide a first color difference signal and a multiplier and a low pass filter on a second data path that provide a second color difference signal.

12. The sampling and color separation unit of claim 7, wherein said composite video signal is an NTSC signal, such that said period of said subcarrier signal is approximately 0.28 microseconds.

13. A method of providing color difference data in a receiver of a video signal having a quadrature-modulated color subcarrier signal, comprising the steps of:

sampling said subcarrier signal, at a sampling frequency such that an integer number of samples are acquired in a time equal to an integer number, plus or minus 0.25, times the period of said subcarrier signal, thereby providing chrominance data;

providing phase reference values at said sampling frequency, said phase reference values each representing a phase relationship between a sample of said chrominance data and said subcarrier signal, such that each chrominance sample has an associated phase reference value;

matching said phase reference values to sin and cosine values; and multiplying each chrominance sample by a sin or a cosine value matched to the phase reference value associated with that sample; and low pass filtering the results of said multiplying step, thereby providing said color difference data.

14. The method of claim 13, wherein said sampling step is preceded by the step of selecting said sampling frequency such that it approximates a target sampling frequency that would produce a desired number of samples per line.

15. The method of claim 13, wherein said matching step is performed such that each said chrominance sample is multiplied by both a sin value and a cosine value, such that each chrominance sample provides two color difference values.

16. The method of claim 13, wherein said step of providing phase reference values is performed by accumulating a constant phase increment in 360 degree cycles.

17. A digital television receiver of a video signal having a quadrature-modulated subcarrier signal for color difference information, comprising:

a signal interface that receives and tunes said video signal;

a sampling and color separation unit having:

an analog-to-digital converter that samples said video signal at a sampling frequency such that an integer number of samples are acquired in a time equal to an integer number, plus or minus 0.25, times the period of said subcarrier signal, thereby providing sampled video data;

a digital luminance-chrominance separator receives said sampled video data and separates said sampled video data into luminance data and chrominance data;

a digital oscillator that provides phase reference values at said sampling frequency, said phase reference values each representing a phase relationship between a chrominance sample and said subcarrier signal, such that each sample of said chrominance data has an associated phase reference value;

a memory that stores sin and cosine values and matches said phase reference values to said sin and cosine values; and a demodulator that receives said sin and cosine values and said chrominance data, multiplies each chrominance sample by a sin or a cosine value, and low pass filters the product, thereby providing color difference data;

a pixel processor that receives said luminance data and said chrominance data and performs pixel processing tasks on said data; and a frame memory that provides said data to a display.

18. The receiver of claim 17, further comprising a spatial light modulator that displays said data.

19. The receiver of claim 17, wherein said memory of said sampling and color separation unit is a look-up table, addressed by said phase reference values.

20. The receiver of claim 17, wherein said digital oscillator comprises an adder and an accumulator.

* * * * *